United States Patent [19]

Chen

[11] Patent Number: 5,267,091
[45] Date of Patent: Nov. 30, 1993

[54] LEVITATING SUPPORT AND POSITIONING SYSTEM

[75] Inventor: Peter C. Chen, Columbia, Md.

[73] Assignee: Computer Sciences Corporation, El Segundo, Calif.

[21] Appl. No.: 732,490

[22] Filed: Jul. 18, 1991

[51] Int. Cl.$^5$ .................... G02B 7/18; H01Q 1/12; H01H 47/00
[52] U.S. Cl. .................... 359/872; 343/880; 104/281; 505/1; 505/825; 361/141; 361/144; 335/216; 335/290; 335/291
[58] Field of Search ............ 359/871, 872, 883, 884, 359/903; 343/787, 878, 765, 880, 882, 912; 505/902, 903, 879, 1, 780, 782, 825, 851; 335/216, 219, 290, 291; 104/281, 282

[56] References Cited

U.S. PATENT DOCUMENTS

| | | | |
|---|---|---|---|
| 3,916,418 | 10/1975 | Erdmann et al. | 359/883 |
| 4,392,435 | 7/1983 | Moody et al. | 104/281 |
| 4,451,119 | 5/1984 | Meyers et al. | 359/883 |
| 4,849,666 | 7/1989 | Hoag | 104/281 |
| 4,875,766 | 10/1989 | Shimodaira et al. | 359/883 |
| 4,979,445 | 12/1990 | Lanzara | 505/902 |
| 5,072,215 | 12/1991 | Brotz | 340/795 |

FOREIGN PATENT DOCUMENTS

0024302 3/1981 Japan .................... 359/883

Primary Examiner—Bruce Y. Arnold
Assistant Examiner—R. D. Shafer
Attorney, Agent, or Firm—Morton J. Rosenberg; David I. Klein

[57] ABSTRACT

A levitating support and positioning system (10) is provided for orienting an electromagnetic energy reflecting assembly (40). System (10) includes a reflective member (60) supported by an annular ring (50) having a plurality of superconductors (70) disposed thereon. Ring (50) is levitated above a base surface (20) by means of a plurality of electromagnetic assemblies (30), each of the electromagnetic assemblies (30) corresponding to a respective one of the plurality of superconductive elements (70), whereby the magnetic fields generated by the electromagnetic assemblies (30) are repelled by the respective superconductive elements. The orientation of the support ring (50), and the reflector therewith, is adjusted by changing the relative magnetic field strength between each of the electromagnetic assemblies (30), allowing the reflector to be directed in both elevation and azimuth.

17 Claims, 6 Drawing Sheets

LEVITATING SUPPORT AND POSITIONING SYSTEM

BACKGROUND OF THE INVENTION

1. Field of the Invention

This invention directs itself to a system for supporting and positioning an electromagnetic energy reflecting device, such as an optical telescope, radio telescope, or radio communications antenna system. In particular, this invention directs itself to a levitating support and positioning system whereby the reflective member is supported above a base surface by attraction or repulsion of magnetic fields. Still further, this invention directs itself to a system wherein the magnetic fields are attracted or repelled by superconductive elements and the positioning is provided by controlling the magnetic field strength at predetermined positions defined on the reflective member's perimeter.

2. Prior Art

Magnetic levitation is well known in the art. The best prior art known to the applicant include U.S. Pat. Nos. 4,881,446; 4,795,113; and, 4,709,883. These prior art systems are directed to means of using magnetic fields to propel a vehicle. Such systems make use of repulsive forces, applied sequentially to propel the vehicle. However, these prior art systems do not suggest the use of such propulsion means for positioning a device in a precise location.

In some prior art publications, such as "Friction in Levitated Superconductors", Applied Physics, Letters 53(16), pp. 1554–1556, 1988, type II superconductors are disclosed as being levitated by the Meissner effect. However, such does not disclose a system whereby the magnetic field strength is varied in order to orient a device to which superconductors are attached.

Publications such as "Advances in Replicated and Plastic Optics", *Proceedings SPIE*, Vol. 115, 1977 and "Production of the First Mirror Shell for the European Space Agency XMM Telescope by Application of a Dedicated Large Area Replication Technique", *Optical Engineering*, Vol. 29, pp. 1267–72, 1990, disclose use of the replication process for forming accurate reflecting surfaces suitable for use in telescopes. However, such publications do not disclose the combination of a levitation and positioning system with a lightweight reflector. Thus, none of the known prior art suggests the concatenation of elements which form the instant invention, whereby significant weight and complexity is eliminated through the use of an electromagnetic levitation system wherein the interrelationship between a plurality of electromagnets and a plurality of respective superconductor elements are separately controlled to provide such functions as linear translation and elevation and azimuth positioning.

SUMMARY OF INVENTION

A levitating support and positioning system for orienting an extra-terrestrial electromagnetic energy reflecting device is provided. The levitating support and positioning system includes a reflective member having a surface reflective of a predetermined bandwidth of electromagnetic energy, on a first side thereof. The system further includes a substrate member coupled to a second side of the reflective member to which a support assembly is fixedly coupled, on a perimeter portion thereof. The system further includes an assembly for levitating the support assembly above a base surface by means of attraction or repulsion of magnetic fields. A control circuit is coupled to the levitating assembly for varying the magnetic field strength of the magnetic fields at predetermined positional locations, such that the reflective surface is thereby oriented in a predetermined direction.

DESCRIPTION OF THE PREFERRED EMBODIMENTS

Referring now to the Figures, there is shown levitating support and positioning system 10 for orienting an extra-terrestrial electromagnetic energy reflecting device 40. As will be seen in following paragraphs, levitating support and positioning system 10 is specifically directed to the concept of providing a unique means of orienting structures of low mass disposed on extra-terrestrial bodies, wherein the gravitational forces are less than that of Earth. Although not restricted to such extra-terrestrial applications, the particular concatenation of elements, as disclosed herein, defines a system which is most efficiently utilized in locations wherein system 10 can be maintained at a temperature below 125° Kelvin, without the need for an ancillary cooling system. Additionally, system 10 provides the means by which electromagnetic reflecting systems can be produced in the form of low mass structures wherein their positioning and spatial orientation can be remotely controlled by a system which is easily transportable by current technology extra-terrestrial launch vehicles such as a Delta rocket launch vehicle. This feature of the instant invention is of particular importance, as prior art mechanical systems for achieving these purposes and objectives are massive complex structures, which would require piecemeal transport in multiple launch vehicles, and would subsequently require complex assembly at the destination site.

Locating a reflective telescope of substantial size on an extra-terrestrial body, such as the lunar surface has been the dream of astronomers for a number of years, but has not been heretofore practical due to the high costs of transporting the heavy structures typical of such systems. The levitating support and positioning system 10 overcomes this obstacle by providing a system which utilizes a thin film reflecting surface formed on a low mass substrate, requiring a minimal support structure, and a means for controlling the orientation of the structure utilizing electromagnetic fields and superconductor technology. The use of electromagnetic fields for controlling orientation of the reflector further reduces the mass of the system, eliminating a large number of mechanical parts and the associated supporting structure they would require.

Figure 1:
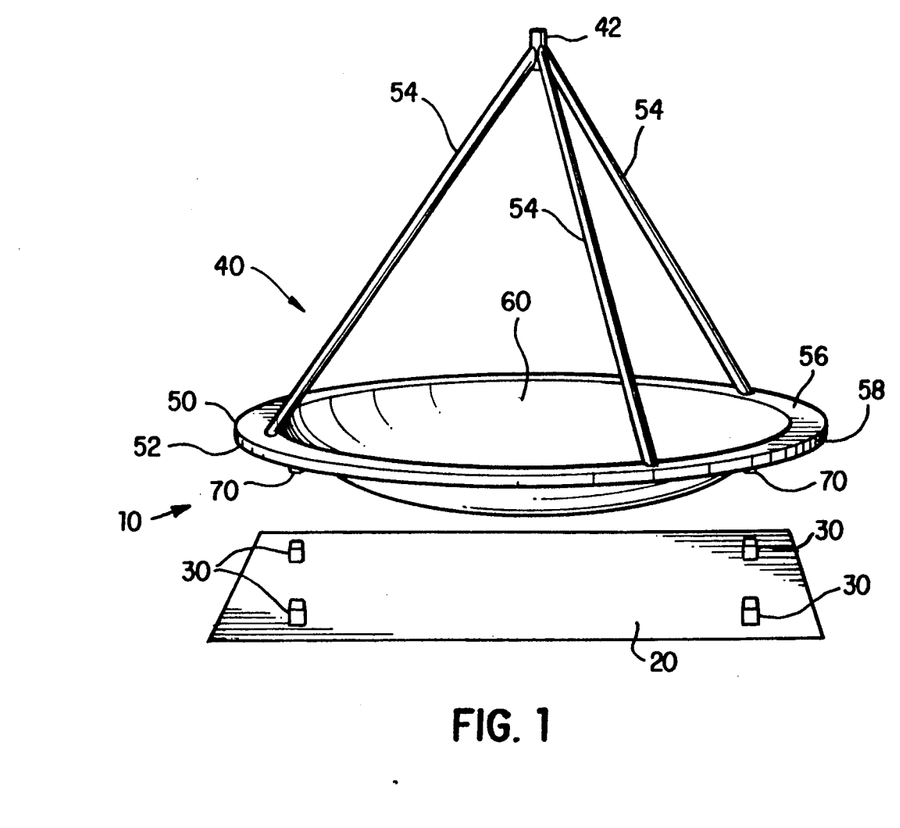
FIG. 1 is a perspective view of the levitating support and positioning system.

Referring to FIG. 1, there is shown the basic structure of system 10. System 10 includes an electromagnetic reflective assembly 40, which may be utilized as part of a reflecting telescope, or alternately, as a reflector for a radiofrequency telescope or communications system. Reflective assembly 40 includes a plurality of superconductive elements 70 which are repelled by a plurality of respective electromagnetic assemblies disposed on the base surface 20. Thus, the reflective assembly 40 is levitated by the interaction between the magnetic fields generated by magnetic assemblies 30 and the superconductive elements 70, an effect known as the Meissner effect. The reflective assembly 40 may then be oriented in a particular direction by means of changing the respective magnetic field strength between respective ones of the plurality of electromagnetic assemblies 30.

Reflector assembly 40 is defined by a composite reflector 60 supported by a substantially circular ring support 50. The reflector 60 is a composite structure which may be formed by the replication process, well known in the art. The annular ring support 50 is formed of a low density, high strength, high stiffness material to which the superconductive elements 70 are attached, on a lower surface 52 thereof.

Figure 4:
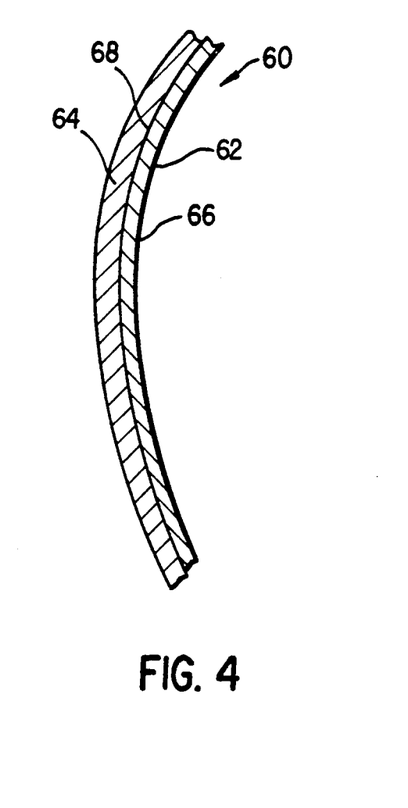
FIG. 4 is a cross-sectional cutaway of the reflector structure.

Referring to FIG. 4, there is shown a sectional cutaway view of the structure of the composite reflector 60. The reflective structure is formed by a very thin metallic film 62 to which a stiff backing 64 of thin material is coupled, to maintain the critical contour of reflector surface 66. The reflector can be easily formed by a replication process, well known in the art, wherein the thin metallic film is applied to a mandrel, which forms the positive image which is replicated to form the reflective surface. The thin metallic coating is applied to the mandrel, which has been specially prepared to allow for the subsequent separation of the reflecting surface therefrom. Subsequent to application of the metallic film, the backing material is applied to the metallic layer disposed on the mandrel, in contiguous overlaying relationship. The backing material is formed of a polymer material, which may be self-bonding, or otherwise secured to the metallic film by adhesive means. In particular, the backing material may be formed of an epoxy composition which may be reinforced with graphite, to provide the desired characteristics of a stiff, thin and low weight support structure.

Metallic film 62 is a thin metallic film having a thickness in the approximating range of 100-2000 Angstroms, which may be applied to the mandrel, not shown, by any of a plurality of well known deposition techniques. The backing material 64 is applied to the rear surface 68 of metallic film 62. The backing material coating is also very thin, by conventional standards, having a thickness in the approximating range of 0.5 mm to 2.0 mm. Since the application for the composite reflector 60 is intended to be extra-terrestrial, such as on the lunar surface, the reflector support structure can be minimized, as there is no atmosphere to produce wind loadings, and the gravitational forces are substantially less than that of Earth. This minimized structure, however, would require that the reflector assembly 40 be transported in the launch vehicle with the manufacturing mandrel, or a facsimile thereof, in order to provide adequate support for the reduced structure during its transport to its extra-terrestrial destination.

The annular support ring 50 is bonded to the backing material layer 64, or formed integrally therewith. The annular support ring 50 must be lightweight, yet provide high strength and high stiffness to adequately support the reflector 60. In addition to forming the annular support ring 50 from the same material compound which forms the backing layer 64, support ring 50 may be formed of foamed ceramic, foamed metallic or plastic compositions to support the reflector 60 and any ancillary structures associated therewith. The annular support ring 50 thus provides the necessary structural support from which the reflector assembly 40 can be supported above the base surface 20, which may be a selected portion of the lunar surface.

A detector 42 is disposed at the focal point of reflector 60, positionally supported by a plurality of tubular support members 54. Support members 54 are coupled to annular support ring 50, either to the upper surface 56, or alternately to the perimeter edge 58. The support members 54 may be coupled to annular ring 50 by means of mechanical fasteners or adhesives. Detector 42 may be any one of a plurality of well known devices, depending on the spectral bandwidth of the electromagnetic spectrum which is to be detected. Detector 42 may be a charge coupled electrooptic detector, an antenna feed horn, transmitter, or the like. Alternately the support members 54 may support a secondary reflector, providing a cassegrain configuration, wherein the detector 42 would be disposed at a secondary focal point, and supported by additional support members 54 coupled to the underside 52 of annular support ring 50.

Reflector assembly 40 is supported above the base surface 20 by means of magnetic fields generated by each of a plurality of electromagnetic assemblies 30, disposed on base surface 20. Such levitating support is provided by virtue of a plurality of superconductive elements 70 disposed on an underside 52 of annular support ring 50. Superconductive elements 70 may be discrete elements equidistantly spaced about annular support ring 50, and may be bonded thereto or otherwise formed thereon. As a further means of reducing weight, the superconductive elements 70 may be formed as a thick film approximately in the range of 20 microns deposited on the backing layer 64, and/or the underside 52 of annular support ring 50. When superconductive elements 70 are maintained at or below the temperature at which they become superconductive, they exhibit a phenomenon which is known as the Meissner effect, whereby the superconductors repel magnetic fields, the repulsion force being utilized in system 10 to levitate the reflecting assembly 40, and thereby obviate the need for any additional support structure to anchor assembly 40 to the lunar surface 20.

Although four electromagnetic assemblies 30 are shown in FIG. 1, obviously a minimum of three electromagnetic assemblies could be utilized, to provide a stable levitating support, or alternately a greater number of magnetic supports could be utilized to support and define the orientation axes for the reflector assembly 40. Each of the electromagnetic assemblies includes both an electromagnet and a permanent magnet, the permanent magnet providing a baseline magnetic field for levitating the reflector assembly, while the electromagnet is utilized to add or subtract from the permanent magnet field in order to change the orientation of the reflector. Utilizing permanent magnets to provide the baseline levitation field, provides a failsafe mechanism in the event of a catastrophic failure in the electromagnet power systems. Further, the efficiency of the electromagnets may be optimized by utilizing superconductive conductors to form the windings for the electromagnet of each of the electromagnetic assemblies 30.

Using the lunar surface as an example, the reflective assembly 40 will be levitated above the lunar surface, the only thermal mechanism affecting it will be that of radiation. The reflector will be directed at a lunar sky which is at 4° Kelvin, below 100° Kelvin the absorption coefficient of most materials is very low, and therefore there will be little heating of the telescope from radiation above that temperature. Therefore if the reflector assembly 40 is disposed within a crater, where it will be in the shade, its temperature has been calculated to be within the range of 40°–100° Kelvin, well within the superconducting range of a large variety of superconducting materials. It is therefore desirable to use type II superconductors for elements 70, such as those formed from ceramic oxide materials. Superconducting compounds ranging from those formed of yttrium-barium-copper oxide to those of the thallium-calcium-barium-copper oxide or bismuth family of compounds, may be utilized in this application.

Figure 5:
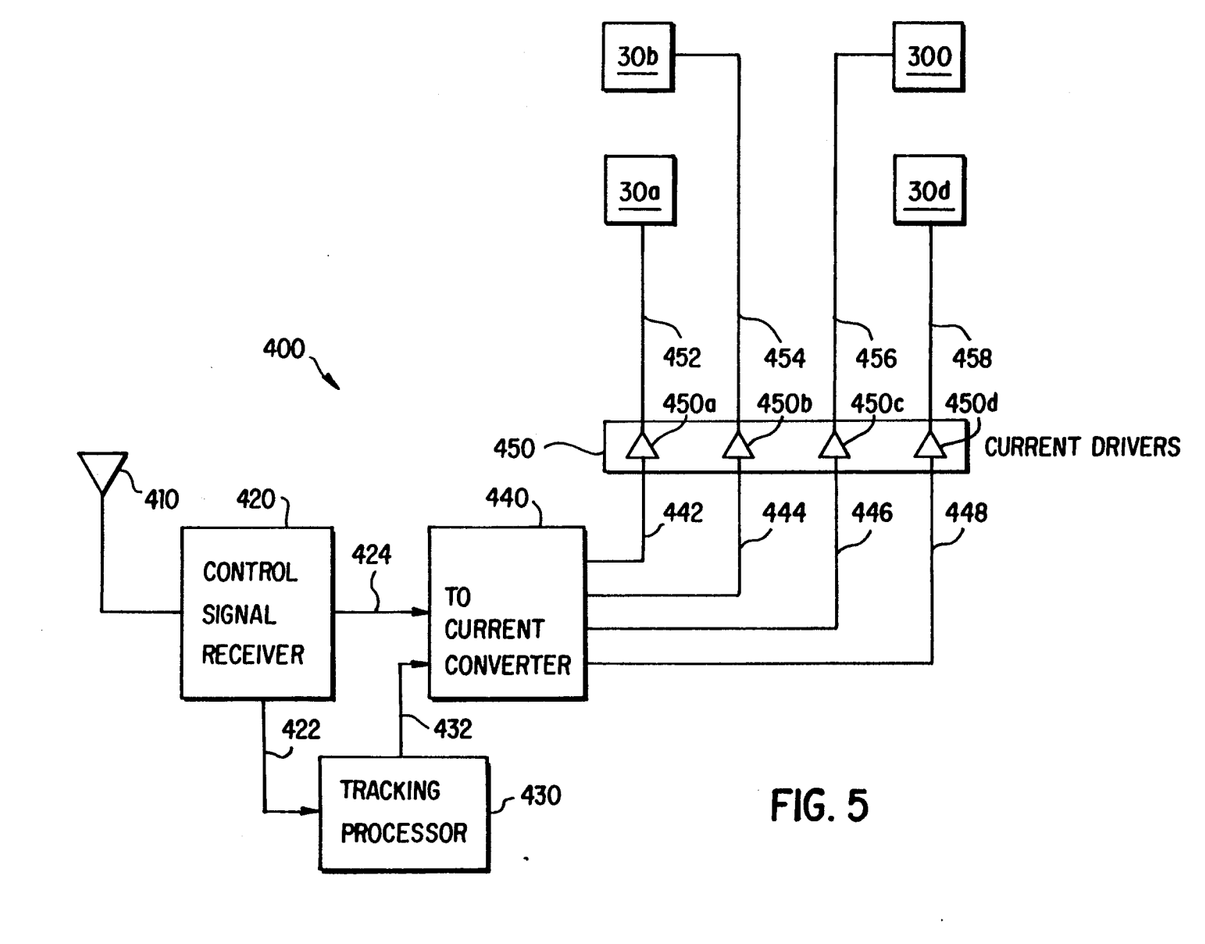
FIG. 5 is a block diagram for the electrical control system of the electromagnets for the embodiment of FIG. 1; and, FIG. 6 is a block diagram for a microprocessor control system for the embodiment of FIG. 2.

Referring to FIG. 5, there is shown a block diagram for the electromagnet control system 400. The control signal receiver 420 receives command and control signals directly from Earth, or through satellite relay, by means of the antenna 410, the control signals providing the necessary commands and data for instructing the computer processors which control the steering of the reflector assembly 40. The demodulated control signals are transmitted to a tracking processor 430 by means of the data link 422. Tracking processor 430 computes the elevation and azimuth angles for pointing the reflector, as well as the rates of change required to maintain the particular portion of the sky within the reflector's view. The data from tracking processor 430 is coupled to the angle-to-current converter 440 by means of the data link 432. Obviously, tracking processor 430 and angle-to-current converter 440 may be modules within a single data processing system, providing the functions described. Additionally, tracking processor 430 may be preprogramed to direct the reflector to predetermined portions of the sky at particular times, according to a programed sequence. This arrangement reduces reliance on the receipt of commands from ground control to position the reflector.

Angle-to-current converter 440 may also receive data directly from control signal receiver 420 by means of the data link 424, wherein ground control can provide the functions normally carried out by tracking processor 430. Angle-to-current converter 440 includes current signal output lines 442–448 for control of respective electromagnetic assemblies 30a–30d. The output lines 442–448 from angle-to-current converter 440 are coupled to the current driver 450, wherein each current output signal from a respective output line 442–448 is coupled to a respective driver 450a–450d to amplify the current signal for providing the required drive current as determined by the angle-to-current converter 440. Each of current drivers 450a–450d is coupled to a respective electromagnetic assembly 30a–30d by the respective output drive lines 452–458.

Thus, by selecting predetermined electromagnetic field strengths for each of the electromagnetic assemblies 30a–30d, the reflector assembly 40 can be articulated to a particular elevation and azimuth, and updated at a predetermined data rate such that the reflector assembly 40 can remain directed at a particular target by compensating for the respective motion therebetween. Each current driver 450a–450d may provide its respective output current drive in the form of pulses, the width of which is varied to establish the desired magnitude of the resulting magnetic field of the respective electromagnet.

Figure 2:
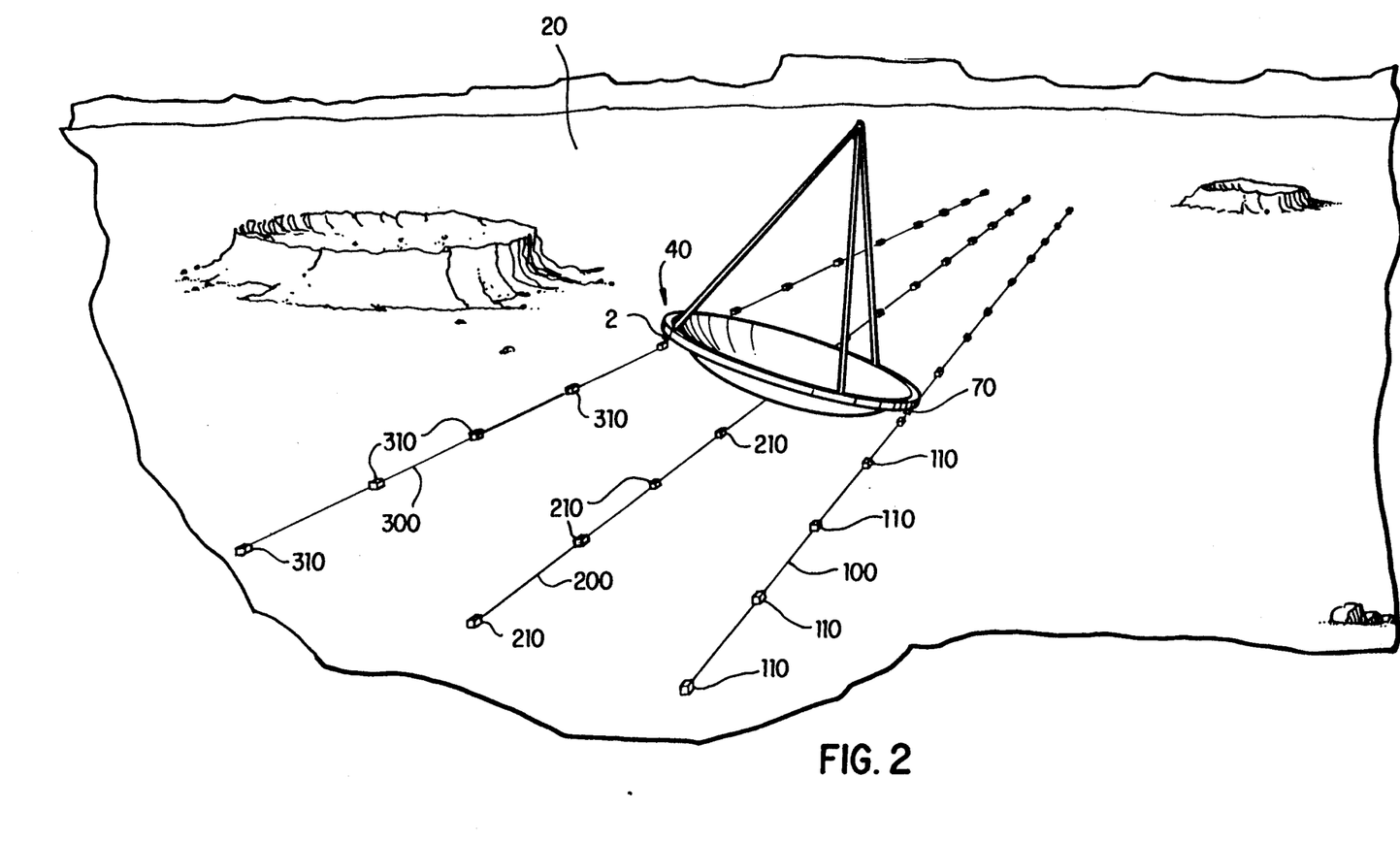
FIG. 2 is another embodiment of the system of FIG. 1.

Referring now to FIG. 2, there is shown another embodiment for system 10, wherein a plurality of electromagnetic assemblies are arranged in a plurality of linear arrays to provide for linear translation of reflector assembly 40 in addition to azimuth and elevation control. The electromagnetic assemblies 110, 210, 310 are arranged in respective linear arrays 100, 200 and 300, extending longitudinally in spaced parallel relation, the electromagnetic assemblies 110, 210, 310 being disposed in spaced relation longitudinally one respective electromagnetic assembly 110, 210, 310 to another 110, 210, 310. A respective one electromagnetic assembly 110, 210, 310 in each of the linear arrays 100, 200, 300 are simultaneously aligned with respective superconducting elements 70, whereby the azimuth and elevation positioning, as previously described, can be carried out. Additionally, the reflector assembly 40 can be translated longitudinally by the sequential pulsing of sequential electromagnetic assemblies 110, 210, 310, creating a linear motor whereby the reflector assembly 40 can be moved back and forth along the track defined by the linear arrays 100, 200, 300.

The electromagnetic assemblies 110, 210, 310 of respective linear arrays 100, 200, 300 may be closely spaced to provide minute adjustment of the position of the reflector assembly 40. Where it is desirable to have the ability to translate the reflector assembly 40 over a substantial distance, such as in an interferometer application, to be described in following paragraphs, the arrays can be formed by electromagnetic assemblies having a greater spacing therebetween, than that required to provide minute adjustment.

Figure 6:
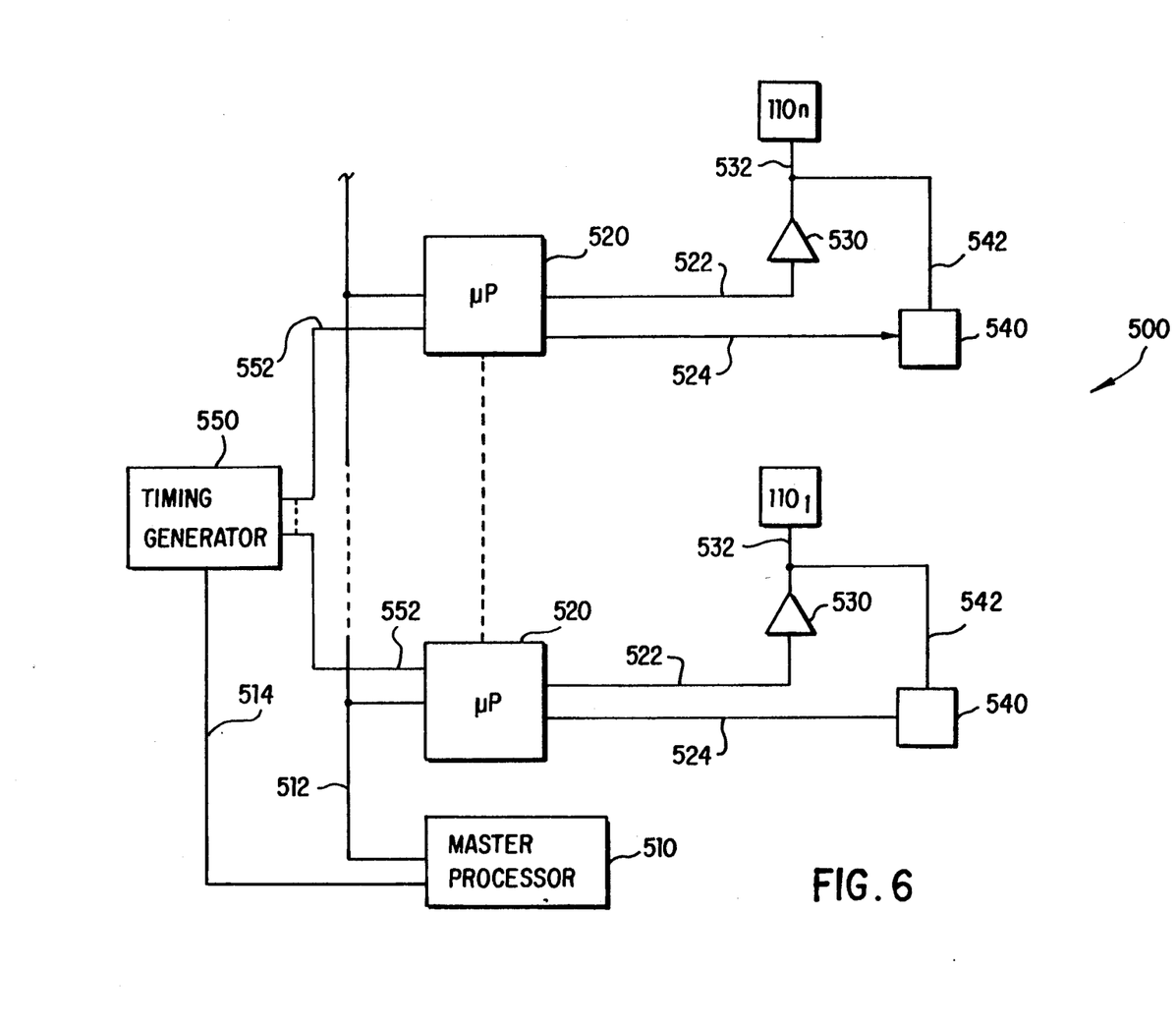

Referring now to FIG. 6, there is shown translation and position control system 500 comprising a master processor 510 and a plurality of slave microprocessors 520, each slave microprocessor 520 being associated with a respective one of the electromagnetic assemblies 110, 210, 310. Master processor 510 is coupled to each of the microprocessors 520 by means of a data and control bus 512. Responsive to the control and data signals from master processor 510, each microprocessor 520 generates a current output signal which is coupled to the current driver 530 by means of the signal line 522. Each of the respective current drivers 530 supply the necessary driving current for a respective electromagnetic assembly $110_1$–$110_n$, as required to orient the reflector assembly 40. Although not shown, the arrangement is identical for electromagnet assemblies 210 and 310, with their respective microprocessors 520 being coupled to the master processor 510.

When it is desired to translate the reflector assembly 40 in a predetermined direction, the master processor 510 provides control signals to the timing generator 550 through the data line 514. Timing generator 550 is provided with a plurality of output lines 552 for sequentially signalling any of the microprocessors 520 in a predetermined order such that the microprocessors provide the necessary control signals to generate a current impulse for the respective electromagnetic assembly to which they are coupled. obviously, timing generator 550 may be a single subsystem adapted for controlling all three linear arrays 100, 200 and 300, or alternately, master processor 510 may be coupled to three separate timing generator systems 550, each respectively being coupled to the microprocessors associated with one of linear arrays 100, 200 or 300.

A particular microprocessor 520 produces a trigger signal on line 524 responsive to an input from the timing generator 550, the trigger signal being coupled to a current impulse source 540. The current impulse output from source 540 is coupled to the respective electromagnetic assembly input line 532 to provide the necessary change in magnetic field to cause the reflector assembly 40 to be linearly displaced with respect to the array of electromagnetic assemblies. Current impulse source 540 may be formed by an electronically switched capacitor bank for supplying a high current impulse to the winding of the electromagnetic assembly to which it is coupled, which may be a separate winding from that utilized to direct the reflector in a particular orientation. This arrangement provides the advantage of being able to utilize the arrays 100, 200, 300 to support and control more than one reflector assembly. In addition to having the ability to independently orient multiple reflector assemblies, each can be longitudinally translated with respect to the other.

Figure 3:
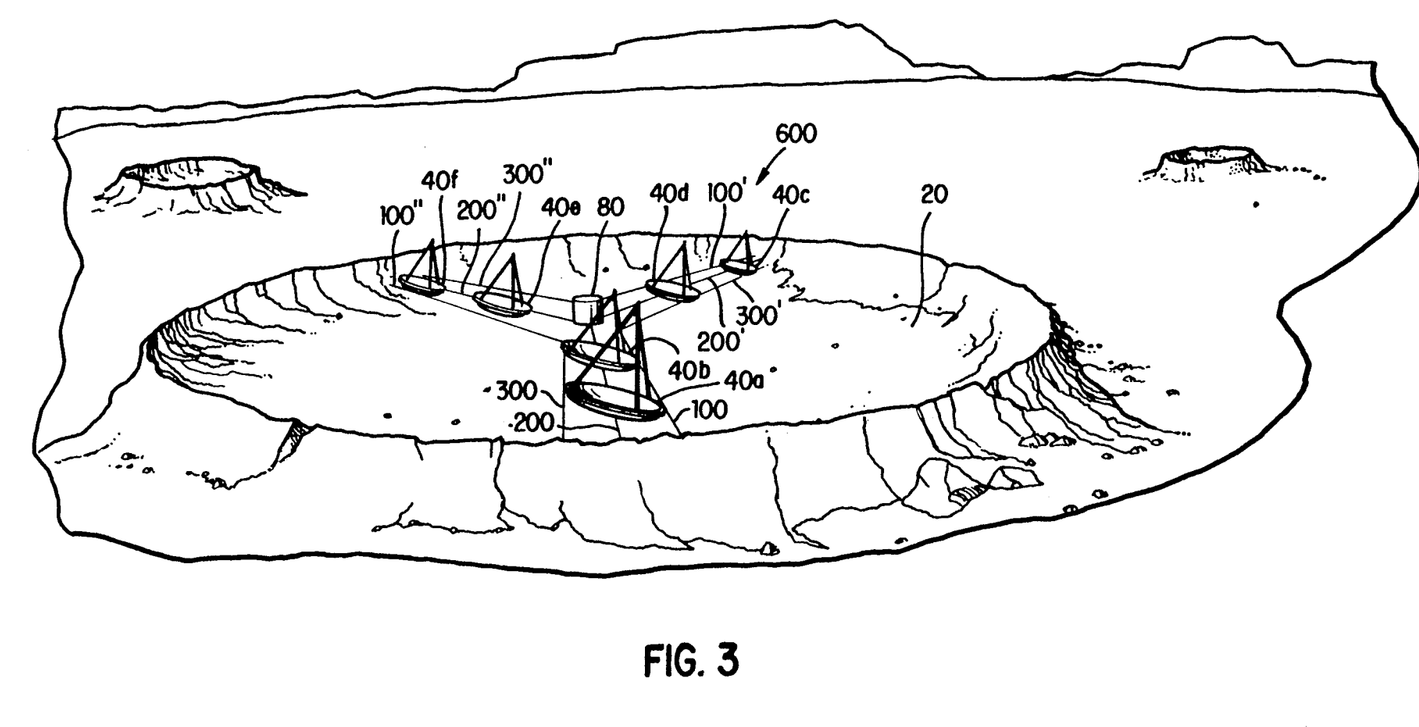
FIG. 3 is an application of the embodiments of FIGS. 1 and 2 to form an interferometer system.

Referring now to the embodiment of FIG. 3, there is shown, a system incorporating the embodiments of FIGS. 1 and 2 to form an optical interferometer system 600. The system incorporates a plurality of reflector assemblies 40a–40f, each directing the received electromagnetic signal to a centrally disposed recombination facility 80. Each of the reflector assemblies 40a–40f may include a secondary reflector, disposed at the focal point of the main reflector for directing the image received by the main reflector to the central recombination facility 80. As is well known in the interferometric art, the recombination facility 80 provides the means by which the optical information is combined to provide interference patterns. The system having the ability to provide adjustment to the baseline pattern, whereby images from different pairs of reflectors can be combined to produce different fringe patterns, such as where the images from reflector 40a with reflector 40c are combined and then subsequently combining the image from reflector 40a with the image from reflector 40d.

System 600 is disposed on the base surface 20, which may be a surface region defined within a lunar crater, whereby three sets of three electromagnetic assembly arrays 100, 200, 300; 100', 200', 300'; and, 100", 200", 300" are symetrically positioned with respect to, and radiating from the centrally disposed recombination facility 80. Each set of arrays may support multiple reflectors, the number of multiple reflectors being defined by the desired field aperture for the interferometer. As previously discussed, the linear arrays of electromagnetics provides the means by which multiple reflectors can be individually oriented, and longitudinally displaced independently. This ability is ideally suited to interferometric systems, wherein it is desired to change the baseline distance between the optical receivers defined by reflectors 40a–40f. Such techniques are typically utilized by astronomers for detecting planets located in close proximity to stars, and for determining the angular diameter of quasars.

Utilizing multiple linear arrays to support multiple reflectors, a complex telescopic system can be formed. Multiple sets of linear arrays can be disposed on the surface 20 in arcuate paths, wherein the multiple sets are arranged in concentric rings, each ring supporting a plurality of reflectors. In this manner, reflectors can be levitated at successively higher elevations above surface 20 in each successive ring moving out from a central position. The combination providing a large segmeted telescope reflector, like that of the Keck telescope, whereby the levitating support and positioning system, as herein described may be utilized to control each of the reflector segments.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is claimed is:

1. A levitating support and positioning system for a reflecting telescope, comprising:

reflecting means for forming a primary mirror of said telescope, said reflecting means including a thin metallic film having a backing material formed thereon;

support means fixedly coupled to a perimeter portion of said reflecting means for providing a displaceable support for said primary mirror, said support means including an annular member coupled to said backing material;

means for levitating said support means above a base surface by repulsion of magnetic fields, said levitation means including a plurality of superconducting members coupled to said annular member; and, control means coupled to said levitating means for varying a magnetic field strength of said magnetic fields at predetermined positional locations, whereby said primary mirror is oriented in a predetermined direction.

2. The levitating support and positioning system as recited in claim 1 wherein said levitating means further includes magnetic field means disposed on said base surface and coupled to said control means.

3. The levitating support and positioning system as recited in claim 2 where said magnetic field means includes (1) a plurality of electromagnetic assemblies, and (2) a plurality of electrical drive circuits electrically coupled to said control means, each of said plurality of electrical drive circuits having an output for supplying a predetermined current signal to a respective one of said plurality of electromagnetic assemblies responsive to a command signal generated by said control means.

4. The levitating support and positioning system as recited in claim 3 where said plurality of electromagnetic assemblies comprises at least three electromagnets.

5. The levitating support and positioning system as recited in claim 3 where said control means includes means for generating said command signals responsive to selected mirror pointing directions.

6. The levitating support and positioning system as recited in claim 1 where said backing material is formed of a polymer material composition.

7. The levitating support and positioning system as recited in claim 6 where said polymer material composition is a thermosetting material.

8. The levitating support and positioning system as recited in claim 7 where said thermosetting material is combined with a reinforcing material composition.

9. The levitating support and positioning system as recited in claim 9 where said reinforcing material composition is graphite.

10. The levitating support and positioning system as recited in claim 1 where said annular member is formed of a foamed ceramic material composition.

11. The levitating support and positioning system as recited in claim 1 where said annular member is formed of a foamed metallic material composition.

12. The levitating support and positioning system as recited in claim 1 where said annular member is formed of a polymer material composition.

13. The levitating support and positioning system as recited in claim 1 where said superconducting members are formed of a material which is superconductive at a temperature below 100 degrees Kelvin.

14. A levitating support and positioning system for orienting an extra-terrestrial electromagnetic energy reflecting device, comprising:
a reflective member having a surface reflective of a predetermined bandwidth of electromagnetic energy disposed on a first side of said reflective member, said reflective member being formed by a metallic film having a thickness in the approximating range of 100 to 2000 Angstroms;
a substrate member coupled to a second side of said reflective member, said second side being opposite said first side;
support means fixedly coupled to a perimeter portion of said substrate member for providing a displaceable support for said reflective member;
means for levitating said support means above a base surface by repulsion of magnetic fields; and,
control means coupled to said levitating means for varying a magnetic field strength of said magnetic fields at predetermined positional locations, whereby said reflective surface is oriented in a predetermined direction, said levitating means including (1) a plurality of electromagnetic assemblies and (2) a plurality of electrical drive circuits electrically coupled to said control means, each of said plurality of electrical drive circuits having an output for supplying a predetermined current signal to a respective one of said plurality of electromagnetic assemblies responsive to a command signal generated by said control means.

15. The levitating support and positioning system as recited in claim 14 where said substrate member is formed of a reinforced polymer material composition.

16. The levitating support and positioning system as recited in claim 15 where said polymer material composition is a thermosetting material.

17. The levitating support and positioning system as recited in claim 16 where said thermosetting material is reenforced with graphite.

* * * * *